Figure 1:
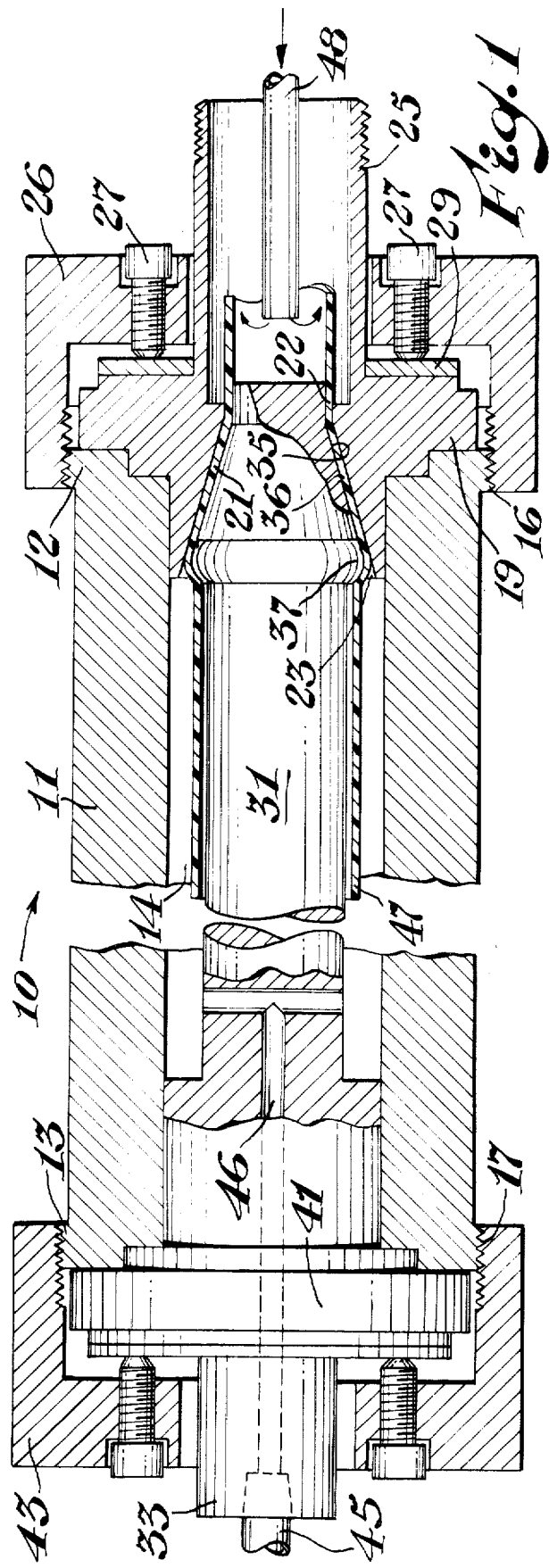

United States Patent [19]

Dawson et al.

[11] 3,959,424

[45] May 25, 1976

[54] METHOD FOR THE PREPARATION OF PLASTIC LINED PIPE

[75] Inventors: David H. Dawson; Douglas S. Chisholm, both of Midland, Mich.

[73] Assignee: The Dow Chemical Company, Midland, Mich.

[22] Filed: Dec. 7, 1973

[21] Appl. No.: 422,805

[52] U.S. Cl.................................. 264/88; 264/249; 264/323
[51] Int. Cl.².......................................... B29C 27/20
[58] Field of Search ........... 264/230, 249, 269, 295, 264/94, 88, 323

[56] References Cited
UNITED STATES PATENTS

| | | | |
|---|---|---|---|
| 3,462,825 | 8/1969 | Pope et al............................ | 264/249 |
| 3,507,941 | 4/1970 | Kies et al............................. | 264/88 |
| 3,560,295 | 2/1971 | Kimbrell et al...................... | 264/89 |
| 3,767,757 | 10/1973 | Vroom et al......................... | 264/88 |
| 3,784,660 | 1/1974 | Hardy.................................. | 264/88 |

*Primary Examiner*—Robert F. White
*Assistant Examiner*—T. E. Balhoff
*Attorney, Agent, or Firm*—Robert B. Ingraham

[57] ABSTRACT

Plastic lined pipe and fittings are prepared by forming a liner of a plastic material having a diameter greater than the inside diameter of the pipe or fitting to be lined, reducing the diameter of the liner by hydrostatically swaging the liner and inserting the swaged liner into the pipe or fitting and permitting the plastic memory of the liner to cause expansion and form an interference fit of the liner with the pipe.

1 Claim, 2 Drawing Figures

U.S. Patent   May 25, 1976   3,959,424

METHOD FOR THE PREPARATION OF PLASTIC LINED PIPE

A variety of methods have been employed for the lining of rigid pipe with various plastics in order to achieve chemical and/or abrasion resistance. Such methods have included insertion of a plastic or rubber liner into a rigid pipe or fitting, such as a steel pipe, and joining the liner to the pipe by means of adhesive. Other lined pipes have been prepared by stretching an elastomeric liner which is oversize to the pipe, pulling the liner into the pipe, releasing the axial tension on the liner, thereby permitting the liner to expand to an interference fit with the pipe. Other techniques include sliding a liner within a pipe, flanging the ends of the liner and maintaining the liner within the pipe section by means of its attachment to terminal flanges. Still another method of lining pipe is to provide a liner of a desired dimension, a malleable casing into which the liner will slide freely and swaging the casing to a smaller diameter which would tend to compress the liner. Another method of providing a plastic lining to a conduit comprises pushing or pulling a liner through a swaging to reduce the diameter and subsequently inserting the liner within the pipe causing it to expand either pneumatically, hydraulically or by pulling a button through the liner to mechanically deform the liner into contact with the pipe. One significant disadvantage of many of the methods employed for lining plastic pipe is the presence of axial orientation within the thermoplastic liner. Axial orientation generally gives rise to axial stress when the lined conduit is subjected to temperature cycling under service conditions and oftentimes results in at least a tendency of the liner to shrink in the axial direction. Any tendency for the liner to shrink frequently results in rupture of the liner, particularly in the region of the terminal flanges.

It would be desirable if there were available a method for the preparation of plastic lined pipe and similar conduit.

It would also be desirable if there were available an improved method for the preparation of plastic liners for pipe which had a relatively small amount of axial molecular orientation.

It would further be desirable if there were available an improved method for the preparation of lined pipe wherein the plastic lining is readily firmly affixed within a rigid outer casing.

These benefits and other advantages in accordance with the present invention are achieved in a method for the lining of conduit or pipe, the method comprising providing a synthetic resinous thermoplastic liner and a rigid outer casing, the rigid outer casing defining a passageway extending therethrough, the liner having a diameter greater than the diameter of the passageway, compressing the liner in a generally radially inward direction to reduce the diameter thereof until the liner can be positioned within the outer casing, positioning the liner within the outer casing and subsequently permitting the diameter of the liner to increase to thereby tightly fit against the inner surface of the outer casing, the improvement which comprises compressing the liner by applying thereto a hydrostatic force sufficient to cause the liner to flow through a liner diameter reducing swaging die.

Further features and advantages of the present invention will become more apparent from the following specification taken in connection with the drawing wherein:

FIG. 1 schematically depicts one embodiment of apparatus for the practice of the invention.

Figure 2:
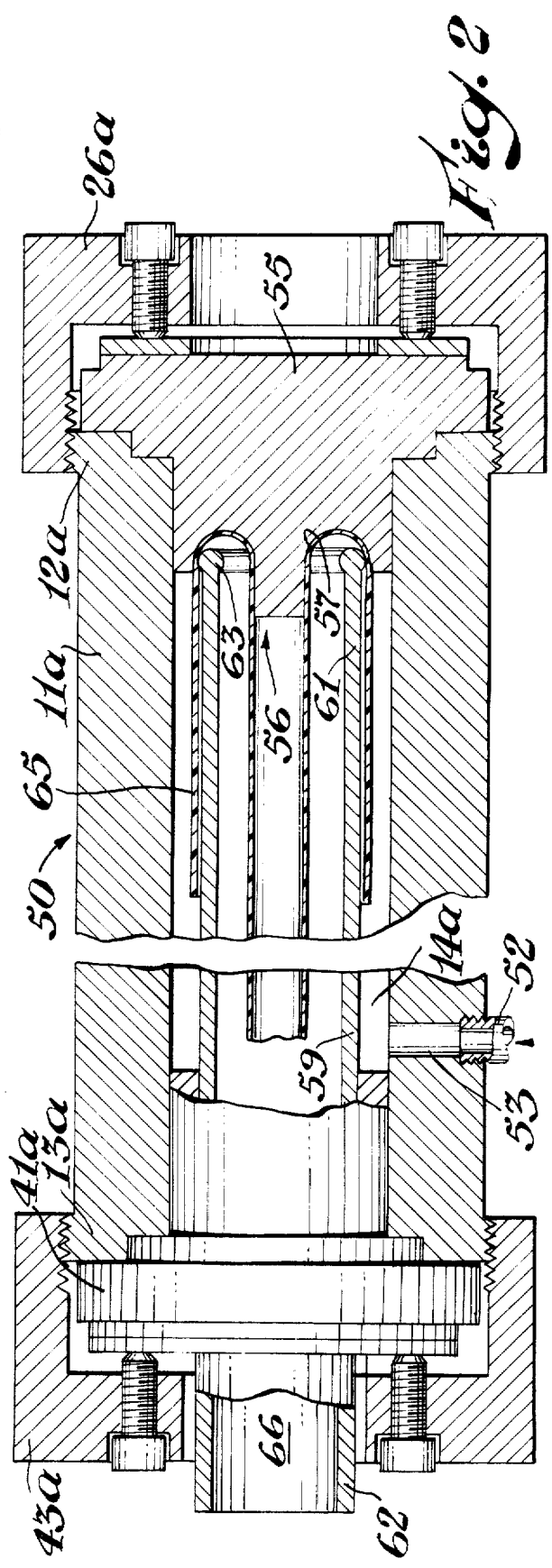

FIG. 2 schematically depicts an alternate apparatus for the practice of a preferred embodiment of the invention.

In FIG. 1 there is schematically represented an apparatus for the practice of the present invention generally designated by the reference numeral 10. The apparatus 10 comprises in cooperative combination a hollow body or casing 11 having a first end 12 and a second end 13. The body 11 defines therein a generally cylindrical passageway 14 extending through the body from the first end 12 to the second end 13. The body 11 has first external threads 16 and second external threads 17 disposed at the first ends 12 and the second ends 13, respectively. A die member 19 is disposed at the first end 12 of the body 11. The die member 19 is in fluid tight mating relationship with the body 11. The die member 19 has defined therein a die passage 21 having a generally frustoconical passageway extending therethrough. The passageway 21 has a first or smaller end 22 and a second or larger end 23. The smaller end 22 is disposed generally remote from the second end 13 of the body 11 while the larger end 23 is disposed generally adjacent the second end 13. Thus, the passage 21 converges in a direction generally away from the body 11. Adjacent to the smaller opening 22 and remote from the larger opening 23, the die 19 has a generally hollow cylindrical end portion 25 remotely disposed from the end 13. A retaining collar 26 of generally annular configuration is disposed about the die 19 and threadably engages the external threaded portion 16 of the body 11. The collar 26 carries a plurality of cap screws 27 which threadably engage the collar 26 and are disposed generally parallel to the axis of generation thereof. A bearing plate 29 is disposed on the die 19 and separates the cap screws 27 therefrom. A mandrel 31 is disposed within the passageway 14 of the body 11. The mandrel 31 has a generally cylindrical configuration, a first end 32 and a second end 33. The first end 32 of the mandrel 31 has a generally frustoconical face 35 which is disposed adjacent the passage 21 of the die 19 and in cooperative combination therewith defines a generally frustoconical passage 36 which converges in a direction away from the second end 13 of the body 11. Disposed between the frustoconical surface 35 and the major cylindrical surface of the mandrel 31 is a transition suface 37. The transition surface 37 is an annular convex surface having a maximum diameter slightly larger than the cylindrical surface of the mandrel. A support and sealing means or support bushing 41 threadably engages the second end 33 of the mandrel and the second end 13 of the body to support the mandrel 31 in generally coaxial relationship within the passage 14. A second end retaining collar 43 threadably engages the thread 17 of the second end 13 of the body 11. The collar 43 is of similar construction to the collar 26 and operates in the same manner. A fluid source 45 is in operative connection with the second end 33 of the mandrel 31. The source 45 is in internal communication with an internal passageway 46 which provides communication between the fluid source 45 and the passage 14 within the body 11. A synthetic resinous thermoplastic liner 47 is depicted. The liner 47 is partially disposed within the cavity 14 and fills the annular portion 36 and a portion extends into the conduit 25. A liner cooling means 48 is shown disposed within that portion of the liner within the end portion 25.

In operation of the apparatus of FIG. 1, a cylindrical thermoplastic liner is positioned over the mandrel 31 and over the transition surface 37. The die 19 is then added to the body in such a manner that the end of the liner is clamped between the wall of the passage 21 and the transition surface 37, the collar 26 and cap screws 27 being used to provide the necessary force for clamping and to provide a liquid tight seal between the die 19 and the body 11. An appropriate hydraulic fluid such as water or oil is provided from the source 45 through the passage 46 into the passageway 14. Sufficient fluid pressure is provided to cause the liner to undergo plastic flow through the annular passageway 46 and out of the end portion 25. Depending upon the nature of the particular plastic material employed, cooling air or water may be provided to the cooling means 48.

In FIG. 2 there is depicted an alternate embodiment of the apparatus for the practice of the present invention generally designated by the reference numeral 50. The apparatus 50 has a body 11a having a first end 12a and a second end 13a. The body 11a defines an internal generally cylindrical passageway 14a. A source of pressurized fluid 52 is in operative combination with the body 11a and is in communication with the passageway 14a by means of a passage 53. A shaping member 55 is in sealing engagement with the second end 12a. The shaping member 55 is of generally circular configuration and defines a shaping face generally designated by the reference numeral 56. The shaping face is directed toward the second end 13a and has defined therein an annular groove 57, the annular groove 57 being generally symmetrically disposed about the axis of the passageway 14a and facing toward the second end 13. Disposed within the passageway 14a is a hollow tubular mandrel 59. The tubular mandrel 59 has a first end 61 and a second end 62. The first end 61 of the mandrel 59 terminates in a beaded edge 63, the edge 63 having a smoothly curved annular surface, the edge 63 being in close proximity to an adjacent surface of the groove 57 of the shaping member 55. A support bushing 41a threadably engages the mandrel 59 and supports it coaxially within the passageway 14. The bushing 41a is maintained in position and in sealing relationship with the body 11a by means of the collar 43a. Similarly, the shaping means 55 is retained by a collar 26a. (In the foregoing description the suffix a has been employed to designate the parts which are either identical or very similar to corresponding parts in FIG. 1.) A synthetic resinous thermoplastic liner tube 65 is shown within an annular portion of the passageway 14a defined between the body 11a and the mandrel 59 and within a hollow passage 66 which extends longitudinally through the mandrel 59.

Operation of the apparatus 50 of FIG. 2 is generally similar to operation of the apparatus 10 of FIG. 1. A liner such as the liner 65 is disposed over the hollow mandrel 59 and the end portion of the liner pinched within the space between the edge 63 and an adjacent surface of the groove 57. Application of hydraulic pressure from the source 52 into the passage 14a causes a liner such as the liner 65 to flow through the annular gap between the edge 63 and the adjacent surface of the groove 57. The curved configuration of the groove 57 causes eversion as the tube progresses into the annular groove 57 and out of the groove 57 and forms a plastic tube of smaller diameter and thicker wall section which passes inside of the plastic tube portion which surrounds the mandrel.

The apparatus of FIG. 2 is particularly advantageous when relatively long liner portions are desired and space is limited. Both the apparatus of FIGS. 1 and 2 provide eminently satisfactory liners having minimal axial orientation. The method and apparatus of the present invention provide a convenient means of reducing the diameter of a liner without a large increase in the length thereof, thereby introducing longitudinal orientation. Usually, such a reducing operation may be accomplished for many plastics at or about room temperature. Such a reduction must be done above the glass or brittle temperature of the plastic liner composition and below the softening temperature thereof. In this temperature range, the plastic material is capable of limited, relatively slow viscoelastic flow under stress and can be deformed to a reasonable degree without rupture of the tube.

Due to the phenomenon of plastic memory, the diameter of the tube portion will not be constant after it leaves the die but will increase at a rate which is both time and temperature dependent. The tube portion, if permitted to expand at a temperature above the glass or brittle temperature indefinitely, will regain a major portion of the diameter reduction induced by the die. However, the rate of recovery is usually sufficiently slow for most synthetic resinous materials that ample time is provided which permits insertion of the tube of reduced diameter into a rigid pipe casing.

A wide variety of thermoplastic resinous compositions are useful in the practice of the present invention including polyperfluorocarbons such as polytetrafluoroethylene, polychlorotrifluoroethylene; polyhalohydrocarbons such as polyvinylfluoride; vinylidene chloride polymers such as sarans, vinylidene chloride-ethyl acrylate copolymers; polyvinyl chloride; polyolefins such as polypropylene, polyethylene, resinous polymers of ethylene and propylene; nylon 6, nylon 66, nylon 7 and the like; alkenyl aromatic polymers including styrene polymers such as rubber-modified polystyrene, styrene/acrylonitrile; polyethers such as polymers of 2,2-bis(chloromethyl)oxacyclobutane and the like.

The essential characteristic of the lining to be operable in the present process is that it be deformable at a temperature below its softening temperature; that is, capable of viscoelastic deformation at a temperature between the glass temperature and the softening temperature. This phenomenon is found in most of the materials referred to as plastics which have not been cross-linked to a point where heat softening can no longer occur.

As the flow phenomenon is temperature and time dependent, more rapid sizing or reduction of the liner may be done at temperatures near the softening temperature, whereas the same amount of deformation may be induced in the liner at a temperature slightly above the glass temperature over a much longer period of time. The recovery or expansion of the compressed liner similarly is time dependent, longer times being required as the temperature approaches the glass temperature and shorter time periods required as the temperature approaches the softening temperature.

With many synthetic resins, the glass temperature is below normal ambient temperature and the softening temperature is well above ambient temperature. Some plastics of this nature are some saran compositions, rubber-modified polystyrene, the so-called "impact" grade polystyrene, polypropylene, polytetrafluoroethylene, resinous polymers of ethylene and propylene, nylon 66, etc.

Oftentimes, compression of the tube is readily obtained at room temperature and when the tube is positioned within the rigid outer casing, gentle warming will cause accelerated expansion to provide a tightly lined conduit. For many purposes, the expansion of the conduit due to plastic memory is adequate to retain the liner within the outer casing, such as a steel pipe, under service requirements. If it is anticipated that there will be a significant tendency of the liner to be sujbect to longitudinal stresses wherein movement is undesirable, generally a larger liner will be employed together with a greater degree of reduction of diameter of the liner either alone or in combination with an expansion technique wherein a "button" or tapered plug is forced through the liner causing it to expand and be deformed into minor imperfections within the pipe wall to provide a lined pipe wherein the liner shows a maximum resistance to movement under an axially applied force; that is, the liner exhibits high push-out resistance.

Lined conduit prepared in accordance with the present invention maintains the liner under a radially inward compressive force which substantially eliminates the possibility of stress cracking of the liner as well as longitudinal movement.

One particularly advantageous mode of preparation of the present invention is to pass the liner through the apparatus of the invention and directly from the die into the conduit to be lined. Thus, if it is desired to produce a lined conduit with a minimal amount of mechanical force, the initial size reduction of the plastic liner may be relatively small and minimal time is required for spring-back of the liner to form a fit within the conduit. After lining, the liner may be flanged.

A wide variety of flanging techniques are well known in the art, some of which are set forth in the following U.S. Pat. Nos.: 2,823,418; 3,020,068; 3,042,965; 3,284,107; 3,284,108; 3,341,894 and 3,383,750.

The following examples illustrate the manner in which the principles of the invention are applied but are not to be construed as limiting the scope of the invention.

Employing apparatus substantially as shown in FIG. 1, a polypropylene tube having a 1/16 inch thick wall and an outside diameter of 2⅜ inches is inserted into the apparatus. The end of the tube is positioned over the transition surface 37, the die installed and tightened into position to provide a pressure seal between the inner surface of the die and the transition surface and water pressure applied to the vessel. Extrusion of the tube from the die is observed at a pressure of approximately 3000 pounds per square inch. At 7000 pounds per square inch, the tube passes from the die opening at a diameter of about 1¼ inches at a rate of about 0.5 inch per minute. The foregoing procedure is repeated with the exception that an annular insert is positioned within the conduit 25 which has an inside diameter approximating the outside diameter of the tube being extruded. Elongation is reduced from about 15 to 10 percent. However, the pressure required is about 9500 pounds per square inch.

In the practice of the present invention, it is desirable in certain instances to employ an adhesive between the outer wall of the lining and the inner wall of the pipe. Many adhesives may be employed and are well known in the art which provide a bond between the liner and the pipe. Heat hardenable adhesives, such as epoxy resins and polyurethanes, are of benefit if adhesion is required at temperatures which are high relative to the maximum service temperature of the lined pipe. Whereas, for low temperature applications, thermoplastic adhesives are employed with benefit. Adhesive bonding of the liner to the casing is desirable, particularly in instances where the lined pipe may be subject to vacuum conditions at temperatures about or above the maximum operating range, and if the lining is not adhered to the pipe the liner has a tendency to collapse. Adhesives which remain soft at low temperatures, such as some thermoplastic adhesives, serve to reduce stress applied to the liner by sudden temperature changes in the metal pipe in some installations. Adhesives may be applied to the inside of the pipe to be lined or to the outside of the liner before it is placed in the pipe; or alternately, injected between the liner and pipe. Microencapsulated adhesives may be employed wherein expansion of the liner provides sufficient force to rupture the capsules and release or activate the adhesive. However, for the majority of applications, pipe lined in accordance with the method of the present invention provides excellent service without liner separation or collapse. Often, the internal surface of the pipe being lined is sufficiently roughened and the liner conforms sufficiently well to the inner surface of the pipe that no significant relative motion is observed.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a method for the lining of conduit or pipe, the method comprising providing a synthetic resinous thermoplastic liner and a rigid outer casing, the rigid outer casing defining a passageway extending therethrough, the liner having a diameter greater than the diameter of the passageway, compressing the liner in a generally radially inward direction to reduce the diameter thereof until the liner can be positioned within the outer casing, positioning the liner within the outer casing and subsequently permitting the diameter of the liner to increase to thereby tightly fit against the inner surface of the outer casing, the improvement which comprises compressing the liner by applying thereto a hydrostatic force sufficient to cause the liner to flow through a liner diameter reducing swaging die, including the step of everting the liner as it is compressed radially inwardly.

* * * * *